Patented Oct. 13, 1953

2,655,004

UNITED STATES PATENT OFFICE 2,655,004

COMPOSITION FOR AND METHOD OF SOLIDIFYING POROUS MASSES AND STRUCTURES

Louis S. Wertz, Cleveland Heights, Ohio

No Drawing. Application February 25, 1946, Serial No. 650,123

26 Claims. (Cl. 61—36)

This invention relates to a composition and process for reinforcing and solidifying porous masses of earth, rock masonry, aggregate, concrete and the like. It particularly relates to a composition and process for forming a very low shrinkage concrete for restoration of old or disintegrated porous masses and for new construction work.

It is an object of this invention to provide an improved, hardenable, cementitious composition which will readily flow under pressure into the voids and cracks of a porous or honeycombed concrete mass or into the voids and interstices of preplaced aggregate.

Another object of this invention is to provide such a suitable composition which will have high flowability, and in which the cement and other solid materials remain uniformly distributed in the mix until solidification takes place, which will tend to expand slightly before set has taken place, and which, when hardened will have high strength and binding power.

Another object of this invention is to provide a process of densifying and solidifying porous masses wherein the voids, cracks, crevices and the like may be substantially filled without segregation of the constituent materials, after which the composition will set and harden firmly to adhere or bond to the surrounding concrete or masonry structure and to the individual pieces of sand, gravel and stone which it surrounds.

In the repair of disintegrated portions of concrete and masonry structures as usually practiced, the disintegrated and loose material is chipped away and the resulting cavity filled by spraying or molding a mixture of cement, aggregate and water onto the chipped irregular surface. This method is not satisfactory, however, because the shrinkage of the material placed in the repair area is relatively high. This high shrinkage may be caused in part by the high proportion of cement particles and in part by the fact that the pieces of aggregate are separated by a cement paste, so that they are actually drawn together by the shrinkage of the cement paste as it dries. The mass of the new material as a whole therefore shrinks. Thus, upon drying, the cavity filling may separate from the old structure. Further, since the surfaces of the structure after removal of loose material are usually irregular and exceedingly hard to fill completely by spraying, it has been found that there are actually voids between the repair area and the existing structure, with the result that the repair area is not firmly bonded to the structure and becomes defective in a relatively short time.

It is a further object of the present invention to provide a new method for repairing disintegrated areas on the surfaces of structures which results in the production of a very strong bond between the repair material and the old structure, and in which the repair material has relatively low shrinkage so that substantially no cracks or voids occur between the repair area and the existing structure.

Still another object is to provide a process for filling cavities, whether in repair work or new construction, wherein the cavity is packed or filled with pieces of already solid material such as coarse aggregate and these pieces later bonded together with a cementitious material.

My prior United States Patents 2,254,252, 2,313,107, and 2,313,110 disclose generally a composition and process for accomplishing the above purposes. However, in accordance with my prior patents, the aqueous slurry comprises besides water, a hydraulic cement, such as Portland cement, a filler containing acidic colloidal silica or pozzolanic material, a relatively small amount of a lubricating agent, such as oleaginous materials, salts and esters of fatty acids or a small percent of mineral oil. This slurry is forced under pressure into porous masses, such as porous concrete, to cause solidification of the same or into masses of preplaced aggregate within a form or cavity to cause firm bonding of the particles together and thus form a concrete which has very low shrinkage during both the period of setting and the period of drying.

As also set forth in my prior patents, protective colloids such as alginates, gelatins, glue, casein, bentonites, gum tragacanth and the like, as well as dispersing agents may be present in addition to the oleaginous lubricant to assist in maintaining a stable suspension. It has been recognized that such protective colloids, and especially bentonite, may be used to prevent agglomeration of suspended particles and to maintain these particles in suspension. However, when effective amounts are used in slurries of Portland or hydraulic cements, these colloids greatly decrease the strength of the concrete or hardened cement composition.

In order to obtain required strengths it was therefore essential to utilize in Portland cement slurries which were to be solidified into useful concrete articles, insufficient amounts of such protective colloids to obtain the desired lubricating effect to permit pumping of said slurry into porous concrete structures or masses. If an oleaginous lubricant were not present in the slurry and if amounts of protective colloids having no deleterious influence on the setting of the cement were used, packing and plugging of hose lines and of the voids and interstices to be filled would occur. Channels from many times the size of the largest particles of the slurry up to an inch or more in diameter can readily pack and plug if the aqueous slurry does not have the proper flowability and at the same time be of such composition that the solids therein will be maintained in suspension as the rate of travel of the slurry through the voids and interstices of the porous mass becomes slow.

The present invention is based largely upon the discovery that in contrast to other protective colloids, the water-soluble cellulose ethers are both effective lubricants and stabilizing agents in concentrations below that in which they act deleteriously to the strength of the hardened concrete or cement mixes. These water-soluble cellulose ethers in small amount act both to maintain fine substances suspended in the slurry and to lubricate the flow of slurry under pressure. Thus, for a given water content of the slurry, there is very much less pressure drop when slurries of the present invention are passed through fine orifices than in the case of slurries heretofore produced utilizing both an oleaginous lubricant and a small but insufficient amount of other protective colloids.

The water-soluble cellulose ethers, while recognized thickening agents, act without any noticeable increase in viscosity when present in the amounts utilized in my hydraulic cement slurries. In fact, when a cement dispersing agent is also present in combination with the water-soluble cellulose ethers, as in the preferred compositions of the present invention, the viscosity of the slurries are materially reduced. The water-soluble cellulose ethers in cement compositions of the present invention also surprisingly act to decrease the ease of dilution by water of an aqueous hydraulic cement slurry.

Besides hydraulic cement and the water-soluble cellulose ethers, the compositions of the present invention preferably also contain a considerable amount of finely divided filler material which may contain an acidic colloidal silica or may be a relatively inert filler such as powdered limestone. Such materials are present in the finely divided state and act to physically separate the particles of the cement and assist in preventing agglomeration of the cement grains.

The materials containing acidic colloidal silica may be added in various finely divided forms of the complex mineral silicates, such as finely ground blast furnace slag, fly ash, and the natural silicious materials generally classified as pozzolanic materials. These materials containing acidic colloidal silica react with lime that may be liberated as a by-product during the hydration of the cement to form compounds having considerable cementitious value. Some types of blast furnace slag which are high in lime are hydraulically active in themselves and are very desirable.

The quantity of finely divided silicious material or acidic colloidal silica used will depend upon the character and qualities desired in the resulting slurry and hardened cement. Usually the silicious material and Portland cement may be used advantageously in about equal proportions. Depending upon the type of silicious material used and the properties desired in the slurry, the above proportion can be varied considerably. The silicious material may vary from an amount equal to one-third that of the Portland cement used to an amount equal to twice that of the Portland cement.

The water-soluble cellulose ethers include methyl cellulose (various viscosities), the derivatives of methyl cellulose such as carboxylated methyl cellulose, the alkali metal salts thereof e. g. sodium carboxy methyl cellulose, water-soluble ethyl cellulose, etc. Of these materials, the methyl cellulose is preferred.

The water-soluble cellulose ethers produce a noticeable effect in cementitious materials of the present invention when they are present in small amounts, such as .005% of the total cementitious solids, i. e. the hydraulic cement plus finely divided filler. For ordinary purposes, .01% or .02% to about .07% or .08% of the weight of the solids of the slurry, i. e. the cement plus filler are used. More than .1% is not usually desirable for ordinary construction. In cases where the slurry is to be pumped into voids between stones, rocks, masonry or aggregate under water, the preferred amount of cellulose ether is about .03% to .1% of the weight of the cement, although as much as .2% or .25% may be used in the grout and such amounts have a tendency to further decrease the tendency of the grout to mix with additional water.

When one selects a particular cellulose ether that produces a relatively high viscosity in a 2% solution, slightly less is usually desirable than when a type of cellulose ether having a lower viscosity in a 2% aqueous solution is used. Thus, I prefer to use slightly more of methyl cellulose having a viscosity of 15 centipoises than of a methyl cellulose having a viscosity of 25 centipoises, based on the viscosity of a 2% solution. In any case the amount used will usually be within .01% to .25% of the weight of cement and finely divided filler.

The water-soluble cellulose ethers are usually difficultly or very slowly soluble in the cold water usually utilized in the making of cement. The ethers may be incorporated in a cement slurry by dissolving in hot water to form a relatively concentrated solution, which is then incorporated with the other cementitious ingredients. I have found, however, that when the water-soluble cellulose ethers are distributed throughout the cementitious mixture used for forming the slurry in the form of a powder and intimately intermingled in finely divided form with the finely divided ingredients of the slurry, a suitable solution is effected or at least the desired effect produced when the dry ingredients are mixed with cold water.

In the practice of the present invention, the cellulose ethers are usually uniformly mixed in the form of a dry powder with all or a portion of the filling material to provide an agent which may be readily added to the remaining ingredients of the slurry at the desired location where the work is to be carried out.

Cement dispersing agents, such as the condensation products or naphthalene sulfonic acids and formaldehyde, waste sulfite liquor, salts of lignin sulfonic acids such as calcium, lignin, sulfonate and the like, have an unexpectedly desirable effect when present in slurries in combination with methyl cellulose. Cement dispersing agents may or may not be present, but when present act to reduce the viscosity of the slurry. They may be present in the amounts of .001% to .4% or .5% of the weight of the cement.

They are preferably present in amounts of .01 to .3% of the weight of the cement.

A gas-producing powder such as aluminum powder is also preferably present in the cement slurry or grout. I have found that .002% to .03% of aluminum powder, preferably .005% to .02% based on the weight of cement plus filler markedly increases the strength of new or restored concrete structures or solidified masses produced by the present process and tends to produce a slight expansion of the cement paste while it is still in the plastic state, thus neutralizing the highly undesirable effect of setting shrinkage that would otherwise take place.

Accelerators may or may not be present in the slurries of the present invention. However, when a dispersing agent is used, it is frequently desirable to use an accelerator capable of increasing the rate of setting of hydraulic cement. The preferred accelerators are triethanolamine and calcium chloride. Triethanolamine, when present, is preferred in amounts of .01% to .05%, although as much as .1% may be present when the slurry is utilized in relatively cold weather. Calcium chloride, when present, should not exceed about 2% or 2.5% based on the weight of the cement.

It is also found that buffer agents capable of maintaining a pH greater than 7 are desirable in the slurry. Buffers preferably used are salts of strong bases with relatively weak organic or inorganic acids, such as trisodium phosphate, sodium acetate and the like. Trisodium phosphate is preferred.

While oleaginous lubricating agents such as mineral oil, fatty acid salts, esters and the like are not necessary in the cement slurry, they may also be present in amounts up to 0.5% of the weight of the cement.

Fine aggregate such as sand may also in some cases be desirable in the slurry. This is particularly the case when the composition of the present invention is used for solidifying packed or loose coarse aggregate, or when the voids and passageways in the structure being solidified are relatively large.

Briefly, an illustration of the process of repairing concrete or masonry structures is as follows:

A plurality of holes are formed, as by drilling, in the surface of the concrete or masonry mass to a predetermined level, and according to a predetermined pattern. The holes may be washed with water to flush out loose materials from the voids and pockets of the porous interior of the concrete or masonry mass, and air under pressure may be supplied to the holes to displace the water or other washing liquid.

The composition is next supplied to the holes under pressure to force it into all the interstices, voids, fissures, etc. in the region of the concrete or masonry and adjacent to the holes. The pressure is usually maintained, as by continuing the pumping after substantial flow of the material ceases, and the composition is usually allowed to set under pressure for a period of time before the pressure is released, so that it will enter the finer voids and remain in place, and become firmly bonded to the existing concrete of the structure. If the concrete or masonry structure is of such thickness that the voids and interstices cannot be thoroughly filled at the depth level of the holes, the holes may be drilled to a further depth level through a portion of the structure just treated, where the process steps of flushing, filling, allowing the repair material to set, and drilling may be repeated as many times as desirable or necessary in order to solidify or densify the concrete structure. When it is desirable to carry the filling process to further than a single depth, the filling operation is preferably done at depth increments of about two or three feet, and the composition may be supplied to the holes by air pressure, or under pressure by a suitable pump.

In the solidification of earth, rock and gravel strata, such as are present at dam and building sites, a properly proportioned mixture of Portland cement, chemically active, finely divided silicious materials such as those previously named, sufficient water to make a slurry, and preferably with one or more of the above mentioned plasticizing or lubricating agents is used in the same manner as in the case of the solidification of other porous structures such as concrete masonry. The composition may be forced for long distances through voids or channels in the rock, gravel and earth strata, with a minimum of frictional resistance, so that cracks and crevices which may provide passages for the seepage of water under the dam, etc., are effectively sealed.

When it is desired to densify and solidify these earth, rock, or gravel strata, holes are drilled to a predetermined desired depth, and the material forced into the holes under positive pressure which may be as high as 500 or 1000 lbs. per square inch. Usually a pressure of about 100 to 300 lbs. per square inch is used, and the pressure maintained on the cement for a considerable time to allow it to flow into the smaller voids as well as the larger ones and to allow the slurry to set under pressure. After solidifying the material at one level, holes may be drilled through the solidified material to a greater depth and this process repeated until the foundation material is solidified to a depth of 200 or 300 feet if desired. Because the pressure used is usually insufficient to open a channel in the foundation, and because the mixture used does not readily clog the voids, the desired solidification of voids of all sizes occurs.

When a low shrinkage concrete is to be prepared or when a cavity in existing concrete structures is to be filled, the cavity to be filled or the cavity in existing concrete from which loose material has been removed is enclosed by a form, or a cavity defined by a form is completely filled with coarse aggregate, which is preferably tamped in place to cause the separate pieces of aggregate to bear against each other. The packed aggregate completely and tightly enclosed by the solid walls of the cavity or form is then solidified by forcing a flowable slurry as above described through and between the pieces of aggregate, all as more fully set forth in my prior Patent 2,313,110 and my copending application Serial No. 451,959, filed July 22, 1942, of which this application is a continuation-in-part.

The following examples illustrate the invention:

Example 1

A mixture of 2 parts of Portland cement, 1 part of a mineral filler, such as fly ash, and .01% of aluminum powder, based on the weight of the cement and filler was divided into five equal batches. Batch No. 1 served as a control; to batch No. 2 was added methyl cellulose in an amount of .05% by weight of the cement plus filler; to batch No. 3 was added methyl cellulose in the amount of .03% by weight of the cement plus filler; to batch No. 4 was added calcium lignin sulfonate (a cement dispersing agent) in the amount of .2% by weight of the cementitious material (cement plus filler); and to batch No. 5 was added .2% by weight of the condensation product of napthalene sulfonic acid and formaldehyde and about .015% by weight of methyl cellulose based on the cement plus filler. The methyl cellulose in each case was of the 25 cps. variety, i. e. that type of methyl cellulose which in a 2% solution gives a viscosity of 25 centipoises at 20° C.

Each batch was divided into three portions. A slurry having a water-cement ratio of .40 was prepared from portion No. 1, and slurries having water-cement ratios of .5 and .55 were prepared from portions 2 and 3, respectively, of each batch.

The consistency factors, water gains, and rates of water extraction were measured for each slurry. The data are given in the following table:

| | Batch No. | Slurry 0.40 | Water-Cement 0.50 | Ratio 0.55 |
|---|---|---|---|---|
| Consistency factor, degrees: Measured by resistance to movement through slurry of a suspended system of paddles. Method is similar in principle to that employed in the torsional viscometer. | 1<br>2<br>3<br>4<br>5 | 84<br>76<br>79<br>55<br>73 | 36<br>35<br>35<br>25<br>30 | 28<br>28<br>26<br>21<br>24 |
| Water Gain, ml: The amount of supernatent liquid, collected after 2 hours at the top of a column of slurry, from 1,000 ml. of slurry contained in a 1,000 ml. graduated cylinder. | 1<br>2<br>3<br>4<br>5 | 7<br>5<br>6<br>10<br>4 | 16<br>7<br>8<br>22<br>6 | 41<br>10<br>14<br>60<br>7 |
| Rate of Water Extraction, Min.: Sec.: The time required to extract 100 ml. of water from 500 ml. of slurry contained in a Buchner funnel on 11 cm. No. 42 Whatman filter paper under a vacuum of 28 inches of mercury. | 1<br>2<br>3<br>4<br>5 | 4:00<br>7:35<br>6:05<br>2:35<br>8:05 | 2:45<br>5:10<br>4:10<br>1:40<br>6:25 | 2:25<br>4:40<br>8:50<br>1:30<br>5:50 |

It will be seen from the above table that the water gain, which is an important measure of stability of slurries, was very greatly reduced by the cellulose ether, particularly in the case where the cellulose ether is combined with a cement dispersing agent. The water gain was very materially less in slurries containing the cellulose ethers than in either the control or with the cement dispersing agent alone. Similarly, the rate of water extraction was much less in the case of slurries having the additions of the present invention. The consistency factor, which is a measure of ease of pumping or forcing the material into voids, was less for the cellulose ether combined with the dispersing agent than for the cellulose ether alone. Thus with the preferred combination grouts of excellent pumpability were produced which at the same time would maintain to a high degree their solids in suspension and would retain to a high degree their water content as they were forced through porous structures.

*Example 2*

The loose material was removed from a deteriorated concrete structure to form a cavity having hard solid walls. The cavity was enclosed by a form and substantially completely filled with dry graded coarse aggregate, which was tamped in place by a suitable vibrator, so that the pieces of aggregate pressed against each other and against the walls of the cavity in the concrete structure and of the form.

A slurry prepared according to batch No. 5 of Example 1, having a water-cement ratio of .5, but also containing sand in an amount equal to that of the cementing material, was forced under pressure through conduits leading to the bottom area of the packed aggregate in the form and caused by pressure to migrate along channels and through the voids between the pieces of aggregate and into contact with the solid walls of the structure and of the form. Pressure was retained on the slurry until set commenced. Core samples showed the new concrete to be of excellent quality well bonded to the old concrete and also showed fine voids in the original structure adjacent the patch to be filled. Due to the fact that the pieces of aggregate remain in contact with each other, drying shrinkage of the new concrete was so reduced that separation cracks between the new and old concrete was prevented.

*Example 3*

Loose coarse aggregate was placed in a space defined by a form and tamped in place so that the pieces of aggregate are in firm contact. A slurry prepared as in Example 2 was forced through conduits leading into the bottom region of the formed area. Sufficient volume was pumped through the conduits to fill the spaces between the pieces of aggregate with the slurry. The slurry was allowed to set and harden in the form. After the form was removed the concrete was observed to have a high compressive strength and materially lower drying shrinkage.

Preferably the form completely encloses the grouted aggregate so that expansion of the slurry cannot take place before or during hardening or setting. Due to the fact that the pieces of aggregate bear against each other and void spaces between the aggregate are minimized, deleterious heat due to the setting of the cement is greatly reduced, so that even very thick walls, etc., may be produced with relative ease and without requirement for artificial refrigeration.

*Example 4*

A slurry prepared as in Example 2 is forced into the interior of a porous concrete structure as set forth in one of my aforementioned prior patents. The pressure required to cause penetration through the voids and interstices of the structure is about one-half that required with lubricants heretofore used. Cores removed from the structure show substantially complete filling of the voids and interstices of the structure and extraordinary high strength.

It is apparent that many modifications of the invention may be made without changing the spirit thereof, and it is intended that the invention be limited only by the appended claims.

What I claim is:

1. A readily flowable and pumpable, fluid, hydraulic cement slurry capable of flowing without substantial segregation of solids over long distances into and through the interstices of porous masses to solidify the same and comprising a hydraulic cement, water, and from 0.005% to 0.25% of suspending agent by weight of the total solids, said suspending agent consisting of water-soluble cellulose ether, and the solids of said slurry all being finely divided, inorganic, non-fibrous particles.

2. The composition of claim 1 in which the cellulose ether is methyl cellulose.

3. The composition of claim 1 in which the cellulose ether is carboxymethyl cellulose.

4. The composition of claim 1 in which the cellulose ether is alkali metal salt of carboxymethyl cellulose.

5. A hydraulic cement composition comprising Portland cement, sufficient water to form a highly fluid and readily pumpable slurry capable of flowing into and through fine cracks and crevices of porous masses, and from 0.005% to 0.25% of suspending agent by weight of the total solids, for maintaining the solids of the slurry in suspension while the slurry is flowing over substantial distances, said suspending agent consisting of water-soluble cellulose ether, and the solids of said composition consisting of finely divided, inorganic, non-fibrous particles.

6. A dry hydraulic cement composition that may be mixed with water to form a readily flowable and pumpable, fluid slurry capable of flowing without substantial segregation of solids over long distances into and through the interstices of porous masses to solidify the same, said dry composition comprising a hydraulic cement and from 0.005% to 0.25% of suspending agent by weight of the total solids, said suspending agent consisting of water-soluble cellulose ether, and the solids of said slurry all being finely divided, inorganic, non-fibrous particles.

7. A dry hydraulic cement composition that may be mixed with water to form a readily flowable and pumpable, fluid slurry capable of flowing into and through fine cracks and crevices of porous masses, said composition comprising Portland cement and from 0.005% to 0.25% of suspending agent by weight of the total solids for maintaining the solids in suspension in a slurry while flowing over substantial distances, said suspending agent consisting of water-soluble cellulose ether, and the solids of said composition consisting of finely divided, inorganic, non-fibrous particles.

8. The composition of claim 7 in which the cellulose ether is methyl cellulose.

9. The composition of claim 7 in which the cellulose ether is carboxymethyl cellulose.

10. The composition of claim 7 in which the cellulose ether is alkali metal salt of carboxymethyl cellulose.

11. A cement composition comprising a hydraulic cement, sufficient water to form a highly fluid and pumpable free-flowing slurry adapted to be pumped over substantial distances into and through fine cracks and crevices of porous masses, and a small amount of suspending agent sufficient to lubricate the slurry and stabilize it against segregation of solids, said suspending agent consisting of water-soluble cellulose ether limited in quantity to an amount that does not materially reduce the free-flowing property of the slurry, and the solids of said composition consisting of finely divided, inorganic, non-fibrous particles.

12. The composition of claim 11 in which the hydraulic cement is Portland cement.

13. The composition of claim 11 in which the water-soluble cellulose ether is methyl cellulose.

14. The composition of claim 11 in which the water-soluble cellulose ether is carboxymethyl cellulose.

15. The composition of claim 11 in which the water-soluble cellulose ether is alkali metal salt of carboxymethyl cellulose.

16. The process of claim 11 in which the water-soluble cellulose ether is ethyl cellulose.

17. The process of producing stable hydraulic cement grouts adapted to be pumped over substantial distances into and through the interstices of porous structures and formations, comprising mixing an hydraulic cement composition consisting essentially of finely divided, inorganic, non-fibrous particles with sufficient water to produce a highly fluid free-flowing slurry, and including in said slurry a small amount of a suspending agent consisting of water-soluble cellulose ether in an amount sufficient to stabilize the slurry against segregation of solids but insufficient to substantially increase the viscosity of the slurry or reduce its free-flowing property.

18. The process of claim 17 in which the cellulose ether is methyl cellulose.

19. The process of claim 17 in which the cellulose ether is carboxymethyl cellulose.

20. The process of claim 17 in which the cellulose ether is alkali metal salt of carboxymethyl cellulose.

21. The process of claim 17 in which the water-soluble cellulose ether is ethyl cellulose.

22. The process of grouting confined spaces in existing structures and formations comprising forming a slurry of a Portland cement composition consisting essentially of finely divided, inorganic, non-fibrous particles in sufficient water to render the slurry highly fluid and free-flowing, including in said slurry a small amount of a suspending agent consisting of water-soluble cellulose ether in an amount sufficient to stabilize the slurry against segregation of solids but insufficient to increase the viscosity of the slurry above that at which it will freely flow over substantial distances, and pumping said slurry into said spaces under pressure to form a cement mass therein.

23. The process of claim 22 in which the water-soluble cellulose ether is methyl cellulose.

24. The process of claim 22 in which the water-soluble cellulose ether is carboxymethyl cellulose.

25. The process of claim 22 in which the water-soluble cellulose ether is alkali metal salt of carboxymethyl cellulose.

26. The process of claim 22 in which the water-soluble cellulose ether is ethyl cellulose.

LOUIS S. WERTZ.

References Cited in the file of this patent

UNITED STATES PATENTS

| Number | Name | Date |
| --- | --- | --- |
| 319,390 | Carrico | June 2, 1885 |
| 2,169,980 | Scripture | Aug. 15, 1939 |
| 2,313,107 | Wertz | Mar. 9, 1943 |
| 2,313,110 | Wertz | Mar. 9, 1943 |
| 2,374,628 | Swayze | Apr. 24, 1945 |
| 2,398,047 | Schmidt | Apr. 9, 1946 |
| 2,432,971 | Ruthman | Dec. 16, 1947 |
| 2,434,302 | Wertz | Jan. 13, 1948 |
| 2,476,306 | King | July 19, 1949 |

OTHER REFERENCES

Gregory: Uses and Applications of Chemicals and Related Materials, v. 2, 1944, page 211.